July 30, 1968  A. C. CARLSON ET AL  3,394,501

SYSTEM FOR CONTROLLING GRINDING PRESSURE

Filed June 17, 1965  2 Sheets-Sheet 1

INVENTORS.
ADOLPH C. CARLSON
RICHARD D. RUTT
BY
*H.W. Brownell*
ATTORNEY

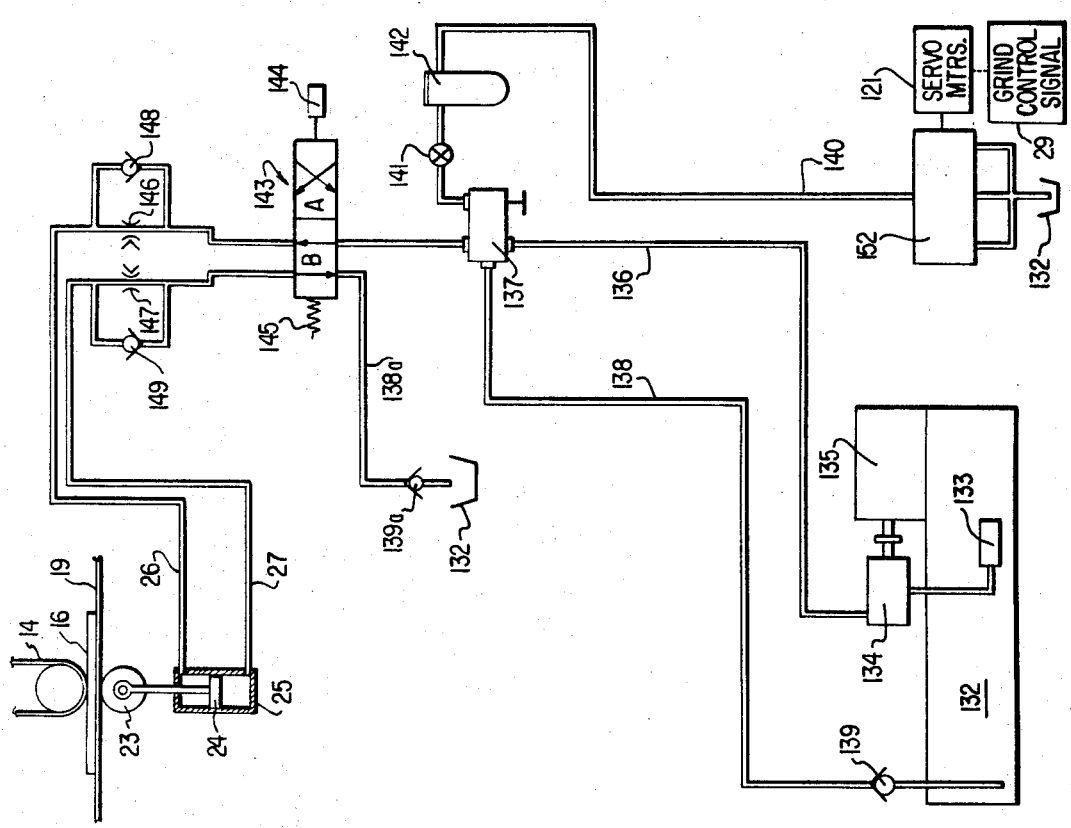

United States Patent Office 3,394,501
Patented July 30, 1968

3,394,501
SYSTEM FOR CONTROLLING GRINDING
PRESSURE
Adolph C. Carlson, Grand Island, and Richard D. Rutt,
Wilson, N.Y., assignors to The Carborundum Company, Niagara Falls, N.Y., a corporation of Delaware
Filed June 17, 1965, Ser. No. 464,719
9 Claims. (Cl. 51—138)

ABSTRACT OF THE DISCLOSURE

A control system for maintaining a constant pressure between an abrasive belt and a workpiece regardless of variations in the thickness of the workpiece. A signal responsive to current drawn by the abrasive belt motor is compared to a reference signal. The unbalanced condition of these signals actuates a servo valve which increases or decreases pressure to a backup roller to adjust the pressure between the belt and the workpiece.

This invention relates to control systems for grinding machines and, more particularly, to a method and apparatus for controlling the pressure between an abrasive surface and a workipece.

Before working metals into shapes, it is customary to remove a thin layer of metal from the surface of the workpiece. This surface layer has inferior mechanical properties, caused by inclusions and various surface defects. Usually, the workpieces are supported on a conveyor and move past the grinding station at a uniform speed. Grinding may be accomplished either by a rotary abrasive wheel, or by an abrasive belt. The thickness of the surface layer that is removed by the grinding apparatus depends primarily upon the amount of pressure exerted between the workpiece and the abrasive surface. Usually the workpieces are not of uniform thickness, and merely maintaining a uniform spacing between the supporting surface and the abrasive surface does not assure that a surface layer of constant thickness will be removed.

An operator may be employed to adjust the position of the abrasive surface relative to the support surface for maintaining a substantially constant grinding pressure regardless of variations in thickness of the workpiece, but an operator is not always able to detect minor variations in thickness. Furthermore, there may not be sufficient time to adjust the grinding pressure, if the conveyor is moving at a relatively rapid rate. Employing an operator for controlling the grinding pressure is relatively expensive and requires that he devote his constant attention to the machine while it is operating. Even then, the surface layer that is removed is not of constant thickness.

It is particularly difficult to remove a surface layer of uniform thickness when the workpiece has a sloping surface. For example, a workpiece may have transverse ridges or waves projecting upwardly on the surface of the workpiece. As the workpiece advances, the grinding pressure on the workpiece increases when the upwardly sloping portion of a ridge moves under the grinding head. It is necessary then to raise the grinding head at a uniform rate corresponding to the slope of the ridge. The position of the grinding head cannot be adjusted manually with sufficient precision to remove a uniform surface layer under such conditions.

Accordingly, it is an object of this invention to provide a grinding machine control system for removing a surface layer of substantially uniform thickness from a workpiece.

It is a further object of this invention to provide a grinding machine control system for automatically controlling grinding pressure.

It is a still further object of this invention to provide a system for rapidly and accurately controlling grinding pressure while workpieces are conveyed continuously past the grinding head.

These objects are accomplished in accordance with the preferred embodiment of the invention by grinding apparatus supporting a grinding head over a conveyor table with the motor driven abrasive surface being positioned adjacent the surface of the table. A backup roller is mounted in the table opposite the abrasive surface and the surface of the backup roller lies substantially in the plane of the table surface. As an alternative, the workpiece may be in the form of a continuous strip which is tensioned and moved through the grinder between the grinding head and the backup roller. A hydraulic control system positions the backup roller relative to the abrasive surface in response to an electrical signal which varies as a function of the grinding head motor current. The hydraulic system incorporates a servo valve which in normal operation is balanced by two opposing signals, one from the grinding motor circuit and the other from a reference signal source. This servo valve controls the fluid pressure in the hydraulic system. The backup roller is connected to a hydraulic piston in the hydraulic circuit, so that the fluid pressure in the system regulates the grinding pressure between the workpiece and the abrasive surface. The control system of this invention therefore adjusts the position of the backup roller is response to the motor current to maintain the grinding pressure constant.

This preferred embodiment is illustrated in the accompanying drawings, in which:

FIG. 3 is a circuit diagram of the hydraulic servo mechanism; and

FIG. 4 is a schematic view of the servo valve.

Figure 1:
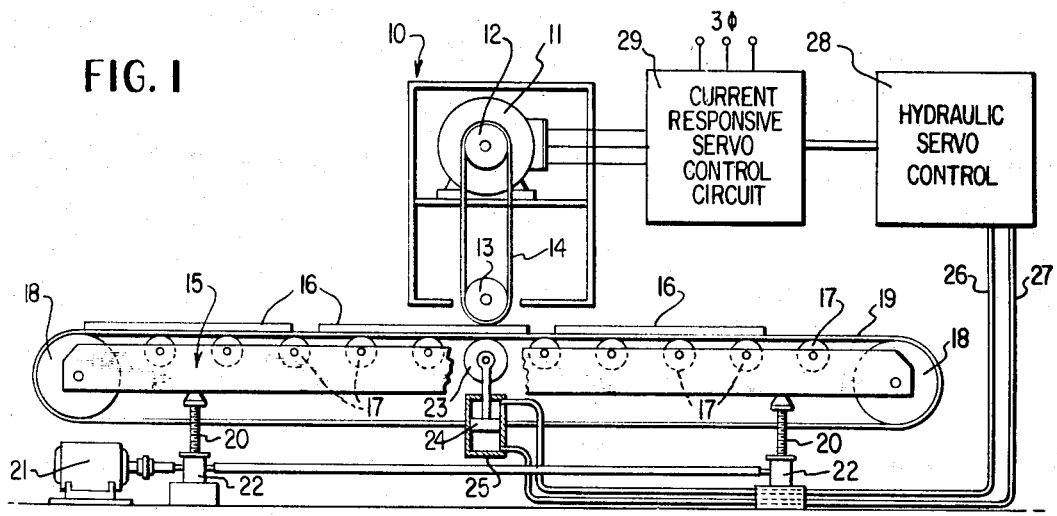
FIG. 1 is a side elevational view, partially schematic, of a grinding machine incorporating the apparatus of this invention.

In the grinding machine illustrated in FIG. 1, a grinding head 10 encloses an electric motor 11. The electric motor drives a belt pulley 12 that is attached to the motor shaft. A pulley 13 is mounted in the grinding head and an abrasive belt 14 is mounted between the pulleys 12 and 13. The pulley 13 extends below the grinding head 10 so that the portion of the belt 14 on the pulley 13 is exposed. The grinding machine includes a worktable 15 for supporting workpieces 16. The worktable includes a plurality of rollers 17 and at each end of the worktable drums 18 are provided for supporting a conveyor belt 19, for transporting the workpieces across the surface of the worktable into contact with the abrasive surface of the abrasive belt 14. One of the drums 18 is power driven and the belt 19 conveys the workpieces 16 across the worktable 15 at a uniform rate. As the workpieces pass under the grinding head 10, the abrasive belt 14 engages the surface of the workpiece 16. The motor 11 rotates the pulley 12 at a high speed and the movement of the abrasive belt 14 relative to the workpiece 16 causes the surface of the workpiece to be abraded.

The worktable 15 is mounted for vertical adjustment on a plurality of screw jacks 20 for the purpose of raising and lowering the worktable relative to the grinding head 10. A reversible drive motor 21 is mechanically connected to the gear box 22 of each screw 20 to insure that the jack screws 20 are driven simultaneously when the motor 21 is activated selectively by the machine operator. Lowering the worktable 15 increases the clearance between the conveyor belt 19 and the abrasive belt 14.

A backup roller 23 is mounted in the worktable 15 opposite the pulley 13. The roller 23 is mounted on, or connected to a piston 24 in a hydraulic cylinder 25. In FIG. 1, the roller 23 is shown schematically as being attached to the piston 24. The backup roller 23 urges the workpiece 16 against the abrasive belt 14 and the depth of metal removed from the surface of the workpiece 16 depends primarily upon the force imposed by the roller 23. Hydraulic fluid is supplied to the cylinder 25 through a pair of conduits 26 and 27. The flow of hydraulic fluid in the conduits 26 and 27 is controlled by a hydraulic servo control 28, which receives fluid under pressure from a control circuit 29. A control signal in the circuit 29 is responsive to the current in the abrasive belt motor 11. Generally, the current in the motor 11 increases as the grinding pressure increases, and therefore the grinding pressure can be regulated as a function of the motor current.

Figure 2:
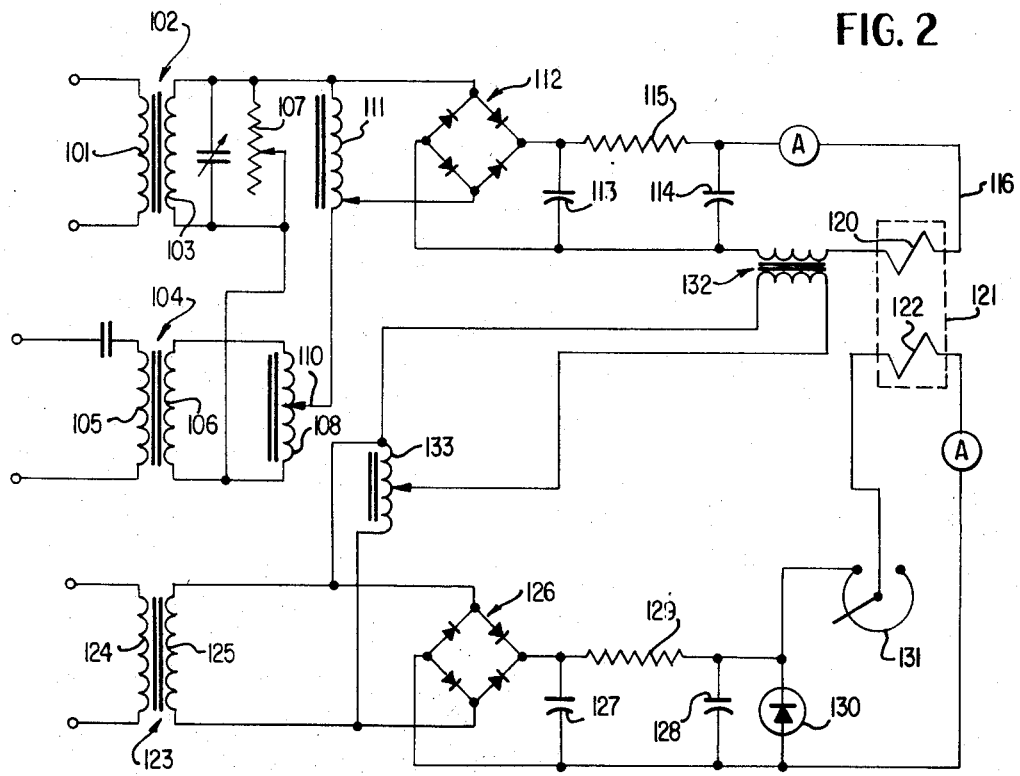
FIG. 2 is a circuit diagram of the servo control circuit.

The motor current responsive control circuit is shown diagrammatically in FIG. 2. The primary winding 101 of a current transformer 102 is connected in series circuit with one of the three-phase current conductors carrying the load current to the grinder motor 11. Consequently, a potential appearing across the secondary winding 103 of the current transformer 102 is proportional to the current drawn by the motor. Another transformer 140 has its primary winding 105 connected across two of the three-phase connections to the grinding motor 11 to develop a potential across its secondary winding 106 that is proportional to the potential supply to the motor. The potential produced by the secondary winding 103 is dropped across an adjustable resistor 107. The resistor 107 adjusts the voltage that is created by the current transformer 102. The potential developed across the secondary winding 106 is dropped across a reactor 108. The adjustable tap on the reactor 108 permits adjustment of the reference level of the signal. When properly adjusted, the reactor 108 causes the system to respond only to changes in grinding pressure. The current used in driving the abrasive belt pulley and associated contact rolls, tracking pulley and abrasive belt are therefore not measured by the system.

The reactor 108 incorporates an adjustable tap which supplies a certain proportion of the potential dropped across the reactor 108 to an inductor 111. The inductor 111 receives a certain proportion of the potential output of the transformers 102 and 104 and mixes these potentials to develop a combined EMF across the inductor 111 representing in-phase components from the transformers 102 and 104. Consequently, the potential dropped across the impedance element 111 reflects the power consumption from the grinder motor 11. Currents set up by this potential are rectified through a full-wave rectifier 112. The output of the rectifier 112 is smoothed by a filter network comprising capacitors 113 and 114 and a resistor 115 linking them. As a result, a well filtered direct current flows in a circuit 116 which is proportional to the power or load current drawn by the grinder motor 11. This direct current is applied to a control winding 120 of an electrically controlled servo valve 121 that is represented by the dashed outline in FIG. 2. The resistor 107 is adjusted so that the current rating of the control winding 120 is not exceeded. The servo valve 121 includes another winding 122 which is supplied with a reference current derived from another source.

For this purpose, an additional transformer 123 has its primary winding 124 connected to a source of alternating current potential. The output potential developed across a secondary winding 125 of this transformer 123 is rectified through a full-wave rectifier 126 and filtered through filter capacitors 127 and 128 and through an interconnecting filter resistor 129. The resulting D.C. signal produced by this filter network develops a constant potential across Zener diode 130. The constant potential thus produced develops a current through an adjustable resistor 131 and through the control winding 122 of the servo valve 121. The Zener diode 130 assures that the maximum voltage does not exceed the voltage rating of the control winding 122. The Zener diode 130 also acts as a voltage regulator to hold constant any current setting for the control winding 122 as determined by the resistance of the variable potentiometer 131. The two currents set up in the windings 120 and 122 of the servo valve 121 operate to balance the condition of the valve in accordance with the sum of the control influence exerted by the currents in both windings.

In an electrically operated continuously variable valve such as this, there is the possibility that certain effects such as friction or viscosity might impede small displacements of the valve in response to the control exerted upon the mechanism. To insure that the signals set up in the control windings 120 and 122 result in bringing the servo valve to the correct control condition a small A.C. signal is introduced into the circuit 116 through a coupling transformer 132. This coupling transformer receives its input potential from a tapped reactor 133 connected across the secondary winding 125 of the reference potential transformer 123. The resulting A.C. ripple, called a "dither signal," by its influence upon the control winding 120 of the servo valve, introduces a vibration into the operation of the valve which overcomes the effects of friction and viscosity.

The hydraulic system is shown schematically in FIG. 3. Hydraulic fluid in the system is drawn from a tank 132 through a filter 133 by a constant flow pump 134 which is driven by a constantly energized electric motor 135. The pump 134 forces the hydraulic fluid under pressure through a conduit 136 to an adjustable relief valve 137. A bypass return conduit 138 leads from the valve 137 to a relief valve 139 and returns the fluid to the tank 132. The relief valve 139 is set to open when the hydraulic presure is slightly above atmospheric pressure to prevent hydraulic fluid from draining from the system when the system is not operating. The relief valve 137 is manually adjusted to allow the hydraulic fluid pressure to build up above the pressure required for grinding. Thus, the motor current responsive valve 121, which operates in the pressure range required for grinding, is not limited by an absolute pressure adjustment. The relief valve 137 also prevents excessive pressure from building up in the system.

A conduit 140 connects the relief valve 137 with the servo valve 121. A needle valve 141 controls the maximum rate of flow to the servo valve 121 and a filter 142 in the conduit 140 is provided. By bleeding a controlled flow of hydraulic fluid through the conduit 140 and back into the tank 132, the hydraulic servo control system causes the relief valve 137 to regulate the pressure at the cylinder 25.

A directional valve 143 receives hydraulic fluid from the relief valve 137 and the position of the valve spool is controlled by a solenoid 144 and a spring 145. When the solenoid 144 is energized, the valve 143 is displaced until the position A of the valve is aligned with the supply and return fluid conduits to supply pressure fluid through the conduit 27 to the lower side of the piston in the hydraulic cylinder 25, thereby urging the backup roller 23 toward the abrasive belt 14. The upper portion of the cylinder 25 is in fluid communication with the tank 132 through the conduit 26 and a return conduit 138a which is provided with a relief valve 139a. When the solenoid 144 is de-energized, the spring 145 displaces the valve 143 to its normal position B to reverse the flow of fluid in the lines 26 and 27, thereby lowering the backup roller 23.

The conduits 26 and 27 connecting the hydraulic cylinder 25 to the directional valve 143 are provided with restricted passages 146 and 147, respectively. These restricted passages slow the flow of fluid through their respective conduits 26 and 27, but are bypassed by conduits having check valves 148 and 149, respectively. The check valves 148 and 149 are arranged to permit hydraulic fluid to bypass the restricted passage in flowing toward the hydraulic cylinder 25, but to direct fluid through the restricted passage in flowing away from the hydraulic cylinder. This combination of a restricted passage and bypass conduit in each conduit 26 and 27 insures that changes in position of the piston 24 and the backup roller 23 are accomplished smoothly.

The servo valve 121 is shown schematically in FIG. 4, and includes the control windings 120 and 122, which form a torque motor acting on an armature 150. The armature is mounted on a fulcrum 151 and the windings 120 and 122 are arranged so that the armature 150 swings either clockwise or counterclockwise depending on the relative magnitude of the currents in the control windings 120 and 122. A servo valve 152 having a movable spool 153 is mounted adjacent the armature 150. The spool 153 is connected to one end of the armature, so that the armature 150 controls the position of the spool 153.

The magnetic field around the control windings 120 or 122 pivots the armature in a clockwise direction when the grinder motor current is greater than the preset reference value. In its neutral position, the spool 153 blocks the flow of fluid from the conduit 140 to the tank 132. When the armature 150 swings clockwise, it displaces the spool to the left to allow fluid to flow from the conduit 140 to the tank 132. The degree of displacement of the spool 153 depends on the extent of unbalance of the current in the control windings 120 and 122. If the current in the winding 120 should become less than the current in the winding 122, for example, due to the presence of a depression in the surface of the workpiece 16, the armature 150 swings counterclockwise to close off the flow of fluid to the tank 132. This increases the pressure in the conduit 27 to urge the piston 24 upwardly, until the grinding pressure substantially equals the preset value.

In operation, the height of the table 15 with respect to the grinding head 10 is adjusted to allow the workpieces 16 to pass between the grinding head abrasive belt 14 and the surface of the conveyor belt 19. The motor 11 is started and the variable resistor 131 is adjusted to obtain the desired grinding pressure. The grinding pressure depends to some extent on the amount of stock to be removed from the workpiece, the grit size of the abrasive belt and the material of which the workpiece is formed. The solenoid 144 is energized to displace the valve 143 to position A to conduct hydraulic fluid under pressure to the hydraulic cylinder 25. Hydraulic fluid under pressure is directed through the conduit 27 to the lower chamber in the hydraulic cylinder 25, thereby displacing the backup roller 23 upwardly to urge the workpiece 16 against the abrasive belt 14 with the desired grinding pressure. Fluid is withdrawn from the upper portion of the cylinder 25 through the conduit 26 and through the restricted passage 160 to the tank 132.

When the adjustments in the electrical circuit and the hydraulic circuit have been made, the abrasive belt 14 will automatically remove a surface layer from the workpieces 16 of a predetermined thickness, since the grinding pressure remains substantially constant although the thickness of the workpiece may vary. Workpieces 16 are arranged on the conveyor belt 19 and move slowly under the grinding head. The position of the backup roller 23 changes in response to the hydraulic pressure in the cylinder 25, as a result of changes in position of the spool 153, as controlled by the servo valve 121.

The hydraulic control system, which responds to the current servo circuit controls the force imposed by the backup roller 23 on the workpiece and therefore controls the distance between the conveyor belt 19 and the abrasive belt 14. Any tendency of the grinding motor power consumption to increase or decrease results in automatic correction in the grinding pressure by an amount sufficient to maintain the power drawn by the grinding motor at a constant level. The system of this invention, therefore, adjusts automatically to variations in thickness of a workpiece as it passes under the grinding head.

In the preferred embodiment of this invention, the grinding head remains fixed with respect to the surface of the table 15, while the position of the backup roller 23 is adjusted. The system of this invention may also be operated by utilizing a stationary backup roller and adjusting a movable grinding head to maintain a constant grinding pressure.

The grinder control system of this invention maintains a substantially constant grind pressure by means of a variable fluid pressure applied to the cylinder 25. In conditioning strip steel, for example, the amount of stock to be removed must be controlled accurately. The strip is supported between break rolls on opposite sides of the grinding head. A backup roll is mounted opposite the grinding head and the strip passes between the grinding head and the backup roll. Strip steel is seldom uniform in thickness throughout its length, but it is only necessary to remove enough surface metal to eliminate imperfections. Therefore, either the backup roll or the grinding head must "float," or follow the contour of the strip. Many conventional grinders operate on the principle of a fixed spacing between the grinding head and the backup roll. However, the spacing must be adjusted to the minimum thickness of the strip and more material than necessary is removed. This waste of material is particularly costly when conditioning expensive metals, such as alloys of rare metals that are used by the aerospace industry. Obtaining the maximum yield from each coil is of primary importance. This can only be accomplished by removing a surface layer of constant thickness, as dictated by the surface condition of the strip, without regard to the total thickness of the strip.

Weld skipping presents another problem in the conditioning of metal. The grinding head is lifted over welded seams and when the grinding head engages the metal again on the opposite side of the welded seam, there is a danger that excessive grinding pressure may be imposed on the metal. The grinding pressure control system of the invention, however, has a rapid response and accurately positions the grinding head relative to the backup roll, so that the pre-set grinding pressure is not exceeded.

While this invention has been illustrated and described in one embodiment, it is recognized that variations and changes may be made therein without departing from the invention as set forth in the claims.

We claim:

1. A control system for grinding machines of the type having means for supporting a workpiece, an electric motor, an abrasive element driven by said motor, and a backup roll opposite said abrasive element, said control system comprising means for generating a signal responsive to current drawn by said motor, means for generating a reference signal, means for comparing said signals, means for adjusting the spacing between the backup roll and said abrasive element, and means for operating said adjusting means in response to said comparing means, whereby the space between the backup roll and the abrasive element varies to maintain the grinding pressure substantially constant.

2. A control system for grinding machines of the type having means for supporting a workpiece, an electric motor, and an abrasive element driven by said motor, said control system comprising means for generating a signal responsive to current drawn by said motor, means for generating a reference signal, means for comparing said signals, a backup roll opposite said abrasive element, a hydraulic actuator, one of said roll and said abrasive element being connected with said actuator for displacement thereby, means for supplying hydraulic fluid to said actuator under pressure, means for modifying said fluid pressure, and means connecting said comparing means and said modifying means, whereby said actuator urges the roll toward said abrasive element with a force varying in response to relative changes in motor current.

3. A control system for grinding machines of the type having means for supporting a workpiece, an electric motor, and an abrasive element driven by said motor, said control system comprising means for generating a signal responsive to current drawn by said motor, means for generating a reference signal, means for comparing said signals, a backup roll opposite said abrasive element, a hydraulic actuator, one of said roll and said abrasive element being connected with said actuator for displacement thereby, means for supplying hydraulic fluid to said actuator under pressure, valve means for bleeding hydraulic fluid from said supplying means and thereby reducing the force of said actuator on said roll, and means coupling said valve means and said comparing means, whereby said actuator urges the roll toward said abrasive element with a force varying in response to relative changes in motor current.

4. A control system for grinding machines of the type having means for supporting a workpiece, an electric motor, and an abrasive element driven by said motor, said control system comprising means for generating a signal responsive to current drawn by said motor, means for generating a reference signal, means for comparing said signals, a backup roll opposite said abrasive element, a hydraulic actuator, one of said roll and said abrasive element being connected with said actuator for displacement thereby, a tank, a first conduit for conducting fluid under pressure from said tank to said actuator, a servo valve body, a spool movably mounted in said valve body, a second conduit for conducting fluid from said first conduit to said valve body, a third conduit for conducting fluid from said valve body to said tank, said spool being in position to control fluid flow between said second and third conduit means, and means coupling said comparing means and said spool, whereby the position of said spool is controlled in response to relative changes in motor current.

5. A control system for grinding machines of the type having means for supporting a workpiece, an electric motor, and an abrasive element driven by said motor, said control system comprising means for generating a signal responsive to current drawn by said motor, means for supplying a substantially constant current signal, means for selectively adjusting said constant current signal, a first inductor in said constant current signal circuit, a second inductor in said motor current signal circuit, an armature adjacent said first and second inductors, means mounting said armature for displacement corresponding to the relative strength of said signals, and means for adjusting the grinding pressure of said abrasive element in response to the position of said armature, whereby the relative motor current controls the grinding pressure.

6. A control system for grinding machines of the type having means for supporting a workpiece, an electric motor, and an abrasive element driven by said motor, said control system comprising means for generating a signal responsive to current drawn by said motor, means for generating a reference signal, means for comparing said signals, a backup roll opposite said abrasive element, a hydraulic actuator, one of said roll and said abrasive element being connected with said actuator for displacement thereby, means for supplying hydraulic fluid to said actuator under pressure, means for modifying said fluid pressure, a first inductor in said constant current signal circuit, a second inductor in said motor current signal circuit, an armature adjacent said first and second inductors, means mounting said armature for displacement corresponding to the relative strength of said signals, and means coupling said armature and said modifying means, whereby said actuator urges the roll toward said abrasive element with a force varying in response to relative changes in motor current.

7. A control system for grinding machines of the type having means for supporting a workpiece, an electric motor, and an abrasive element driven by said motor, said control system comprising means for generating a signal responsive to current drawn by said motor, means for generating a reference signal, means for comparing said signals, a backup roll opposite said abrasive element, a hydraulic actuator, means for connecting said roll to said actuator for displacement thereby, a tank, a first conduit for conducting fluid under pressure from said tank to said actuator, a servo valve body, a spool movably mounted in said valve body, a second conduit for conducting fluid from said first conduit to said valve body, a third conduit for conducting fluid from said valve body to said tank, said spool being in position to control fluid flow between said second and third conduit means, a first inductor in said constant current signal circuit, a second inductor in said motor current signal circuit, an armature adjacent said first and second inductors, means mounting said armature for displacement corresponding to the relative strength of said signals, and means coupling said armature and said spool, whereby the actuator urges the roll toward said abrasive element in response to relative changes in motor current.

8. Grinding apparatus for removing a substantially uniform surface layer comprising means for supporting a workpiece, an electric motor, an abrasive element, means forming a driving connection between said abrasive element and said motor, a backup roll opposite said abrasive element, a hydraulic actuator, one of said roll and said abrasive element being connected with said actuator for displacement thereby, a tank, a first conduit for conducting fluid under pressure from said tank to said actuator, a valve body, a spool movably mounted in said valve body, a second conduit for conducting fluid from said first conduit to said valve body, a third conduit for conducting fluid from said valve body to said tank, said spool being in position to control fluid flow between said second and third conduit means, means for supplying a substantially constant current, means for generating a signal responsive to current drawn by said motor, a first inductor in said constant current signal circuit, a second inductor in said motor current signal circuit, an armature adjacent said first and second inductors, means mounting said armature for displacement corresponding to the relative strength of said signals, and means coupling said armature and said spool, whereby the actuator urges the roll toward said abrasive element in response to relative changes in motor current.

9. A control system for maintaining substantially constant grinding pressure between an abrasive element and a workpiece while conveying workpieces between the abrasive element and a backup roll comprising: means for applying fluid pressure to the backup roll; means for driving said abrasive element; means for generating a signal corresponding to the power consumed in driving said abrasive element; means for generating a reference signal; means for comparing said signals; and means for adjusting the fluid pressure applied to said backup roll in response to said comparing means.

References Cited

UNITED STATES PATENTS

| 2,648,176 | 8/1953 | Zimmerman | 51 135 |
| 2,168,596 | 8/1939 | Hall | 51—111 |
| 2,925,691 | 2/1960 | Kibble | 51—76 X |
| 3,100,954 | 8/1963 | Di Lella | 51—165 |
| 3,118,254 | 1/1964 | Di Lella | 51—165 X |
| 3,271,909 | 9/1966 | Rutt et al. | 51—138 X |

LESTER M. SWINGLE, *Primary Examiner.*